Figure 1:
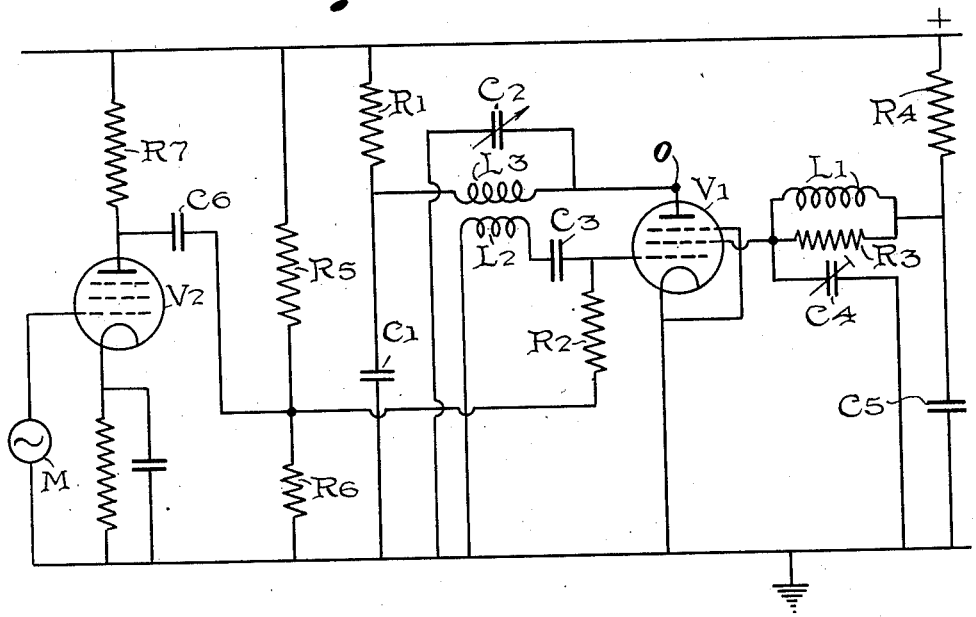

July 20, 1948.    O. H. DAVIE    2,445,662

FREQUENCY MODULATION SYSTEM

Filed Oct. 26, 1944

Inventor
OWEN H. DAVIE
By Ralph B. Stewart
Attorney

Patented July 20, 1948

2,445,662

UNITED STATES PATENT OFFICE 2,445,662

FREQUENCY MODULATION SYSTEM

Owen Hosmer Davie, London, England, assignor to A. C. Cossor Limited, London, England, a British company Application October 26, 1944, Serial No. 560,498
In Great Britain November 13, 1943

7 Claims. (Cl. 250—36)

This invention relates to generators of frequency modulated oscillations.

The generator according to the invention employs a thermionic valve of the kind having two output electrodes and having a control grid controlling the sum of the currents of these output electrodes. The pentode and the hexode are examples of such valves.

In carrying the invention into effect, a feedback oscillator circuit, of the kind employing a resonant network, is connected between one of the output electrodes and the control grid; a network comprising reactive impedance is connected between the other of the output electrodes and the cathode; and means are provided for varying the control grid damping of the valve in accordance with the modulation of frequency required.

The valve may conveniently be a pentode with suppressor connected to cathode, or a hexode with outer control grid connected to cathode through a source of steady negative bias. The feedback oscillator circuit is then preferably connected from anode to inner control grid, and the network containing reactive impedance is then connected to the screen. By "reactive impedance" is meant an impedance which exhibits substantial reactance but which may or may not also exhibit substantial resistance.

The feedback oscillator circuit may have its resonant network or networks, which approximately determine the carrier frequency, connected either in the circuit of the output electrode or in that of the control grid or in both.

The control grid damping consists mainly of energy dissipated at the control grid, and this is due mainly to components of grid current at oscillation frequency and at harmonics thereof. Methods of varying the grid dissipation generally involve simultaneous variation of the mean current to the control grid, and if this is drawn through a grid leak resistor there is then also a change of energy dissipation in the grid leak. The amount of the grid dissipation, however, greatly exceeds that of the grid leak dissipation.

The required variation of the grid damping will usually be effected by variation of the potential of a point which is connected to the control grid through a high impedance, for example a grid leak. The mean value, about which the potential of this point will be varied in order to modulate the frequency, will usually be a value which is a few volts positive relative to cathode. If this potential is taken more than a few volts negative, e. g., 3 or 4 volts negative, modulation ceases to be linear; but it remains linear up to a substantial positive voltage, e. g., at least 20 volts. A positive voltage limit is usually set, not by non-linearity, but either by grid heating or else by the permissible peak cathode current.

The invention is particularly applicable to generators arranged to be tunable over a range of carrier frequencies, with substantially constant deviation sensitivity throughout the range. With a 2:1 range of carrier frequency coverage, for example, the deviation sensitivity can easily be kept within ±5% in a circuit according to the invention. An even greater degree of constancy can often be obtained.

Figure 2:
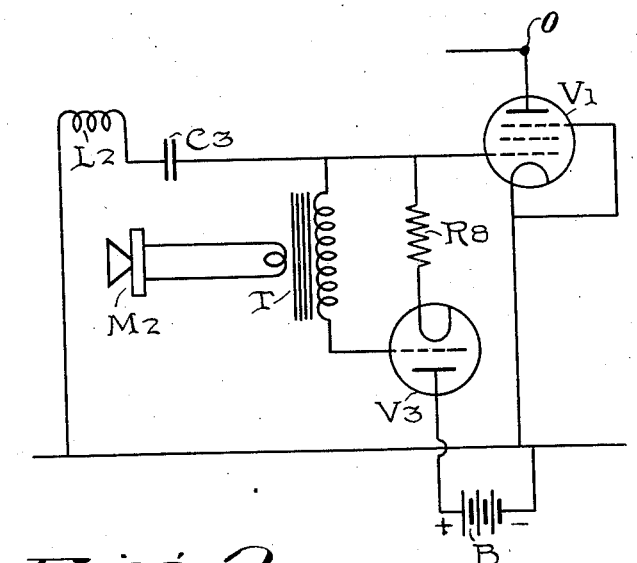

In the accompanying drawing, Figure 1 is a circuit diagram of a frequency-modulated oscillator embodying the invention, and Figure 2 is a fragmentary diagram of a modified modulation arrangement for substitution in the circuit of Figure 1.

In Figure 1, the pentode valve V1 has a feedback oscillator circuit of tuned-anode type connected between its anode and control grid. The oscillator circuit comprises a parallel-resonant network consisting of inductance coil L3 and variable condenser C2, and comprises tickler coil L2 coupled with coil L3. The anode supply from the positive line is decoupled by resistor R1 and condenser C1. Condenser C3 and resistor R2 are the conventional grid condenser and grid leak.

The grid leak R2 is connected to a point having a potential which is varied in accordance with the modulation required, but which has a mean value a few volts positive relative to cathode. This point is shown as the junction of resistors R5 and R6, which form a potentiometer connected across from the positive line to earth. The varying modulation voltage is developed by coupling this junction, by means of blocking condenser C6, to the anode of an amplifier valve V2, which has the modulating source M connected to its input.

The screen grid circuit of valve V1 comprises a reactive impedance network consisting of inductance L1, resistor R3 and condenser C4, all effectively in parallel with each other. The values of these components are selected and adjusted empirically so as to give a desired deviation sensitivity (i. e., frequency change per modulation volt) which is substantially constant throughout the range of carrier frequency tuning provided by variable condenser C2. It will be found that the frequency at which the selected values of inductance L1 and condenser C4 would themselves resonate is below and remote from the said range of carrier frequencies. Resistor R3, when provided, prevents a fall of deviation sensitivity in the middle of the range. But it may not be necessary, especially if the Q of the coil L1 is not very high. Resistor R4 is by-passed by condenser C5 at oscillation frequencies.

The output from the generator may be taken at terminal 0 from the anode of valve V1.

The effect of the reactive impedance network in the screen circuit is to introduce a substantial phase-shift into the oscillator circuit, that is, it introduces a phase shaft in the anode current of the oscillator and the amount of the phase shift determines the deviation sensitivity (change in carrier frequency per volt of modulation). The effect of the application of modulation voltage between the cathode and the foot of the grid leak is to introduce into the oscillator a degree of grid damping varying substantially proportionally with instantaneous modulation voltage. These effects together give substantially linear frequency modulation, with only a small degree of accompanying amplitude modulation.

In an oscillator constructed in accordance with the circuit diagram, using a 1S4 valve as valve V1, the following component values have been found satisfactory:

C1—0.01 microfarad
C2—280 picofarads maximum
C3—300 picofarads
C5—500 picofarads
R1—500 ohms
R2—68 kilohms
R3—10 kilohms
R4—20 kilohms
R5—150 kilohms
R6—4.7 kilohms
R7—4.7 kilohms Switching arrangements were provided to insert suitable coils L1, L2, L3, a suitable condenser C4 and, if required, a suitable resistor R3 for each of three tuning ranges. The values of L3 were conventionally selected for tuning with condenser C2 over the several ranges, and those of L2 were conventionally selected for coupling with L3.

On each tuning range the inductance L1 and capacitance C4 were of pre-set adjustable type. Dust-cored coils were used for inductance L1, and on the two higher frequency ranges the Q's of these coils were sufficiently low to make the provision of a resistor R3 unnecessary. When provided, it was of fixed value, fine adjustment of its resistance being found unnecessary.

The values for the different ranges were as follows:

0.525 to 1.075 mc./s.:
  L1—4.88 to 8.625 millihenries (Q=35)
  C4—22 to 40 picofarads
  R3—15 kilohms
1.05 to 2.15 mc./s.:
  L1—1.94 to 3.28 millihenries (Q=33)
  C4—17 to 37 picofarads
2.1 to 4.3 mc./s.:
  L1—690 to 1175 microhenries (Q=22)
  C4—2 to 20 picofarads On each tuning range in turn, the value of C4 was adjusted first at the high frequency end of the range, and the value of L1 last at the low frequency end.

With 90 volts high tension supply it was found possible, for each of the tuning ranges, to obtain a frequency deviation sensitivity of 0.62 kc./s. per volt R. M. S. for audio frequency modulation voltages. The frequency deviation showed good linearity over the modulation voltage range from minus 8 volts up to more than plus 20 volts, and remained substantially constant throughout each tuning range.

On changing to 60 volts high tension supply, without alteration of the adjustment of any of the components, it was found that the value of the deviation sensitivity was increased but still remained equal as between the different tuning ranges, and substantially constant throughout each tuning range. Linearity was retained over the modulation voltage range from minus 4 volts to more than plus 20 volts.

The amplitude modulation which accompanied the full frequency modulation sweep did not, at any tuning setting, exceed 5%.

Where the modulation voltage is at least of audio frequency, it may, instead of being applied to the control grid through the grid leak R2, be applied to the control grid through a high frequency choke and coupling condenser, the grid leak then being returned directly to a source of small positive bias. With this arrangement the deviation sensitivity is substantially increased.

In the arrangement which has been described, the screen grid circuit is so adjusted that the deviation sensitivity in each tuning range is substantially independent of the carrier frequency. By an alternative selection of the value of the reactive impedance in the screen grid circuit, it is possible to obtain any other desired law of variation of deviation sensitivity with carrier frequency; e. g., approximate proportionality between them may be secured by the use of a nearly purely capacitive impedance. For the majority of such laws, however, it will be found that the reactive impedance will comprise both inductance and capacity, as well as resistance, and that these will be such as to resonate at a frequency outside the range of carrier frequencies to be covered.

Figure 2 is a fragmentary diagram of an alternative control grid circuit for valve V1 which may be substituted for that shown in Figure 1.

In the arrangement shown in Figure 1, the modulation of the grid damping is effected by modulation of the potential of a point to which the foot of a grid leak of constant value is connected. In the arrangement shown in Figure 2, on the contrary, it is effected by modulation of the resistance of a grid leak which is connected to a point of small constant positive potential.

The anode-cathode path of an indirectly heated triode V3 serves as grid leak. Its anode is connected to the positive end of a small battery B, the negative end of which is connected to the cathode of valve V1. The voltage of this battery may, for example, be about 10 or 15 volts.

The resistance of the anode-cathode path of valve V3 is modulated by variation of the potential of its control grid relative to its cathode. This modulation is produced by the secondary winding of transformer T, the primary of which is connected directly across a microphone M2. Negative bias, and a small degree of negative feedback, are provided for valve V3 by a small resistor R8 connected in its cathode lead.

I claim:
1. A generator of frequency modulated oscillations comprising a thermionic valve having two output electrodes and having a control grid controlling the sum of the currents of said output electrodes, a feedback oscillator circuit connected between one of said output electrodes and said control grid and including a resonant network generating a carrier wave of predetermined frequency, a second resonant network connected to the other of said output electrodes and being tuned to a frequency lower than said carrier wave, and means to vary the control grid damping in accordance with the modulation of frequency required.

2. A generator of frequency modulated oscillations comprising a thermionic valve having a cathode, two output electrodes, and a control grid controlling the sum of the currents of said output electrodes, a feedback oscillator circuit connected between one of said output electrodes and said control grid and including a resonant network, a network comprising reactive impedance connected to the other of said output electrodes, a source of biasing potential for biasing said grid positively with respect to said cathode, a grid leak resistor connected between said grid and said biasing source, and means for varying the potential of said biasing source in accordance with the modulation of frequency required.

3. A generator of frequency modulated oscillations comprising a thermionic valve having a cathode, two output electrodes, and a control grid controlling the sum of the currents of said output electrodes, a feedback oscillator circuit connected between one of said output electrodes, and said control grid and including a resonant network, for generating a carrier wave of a predetermined frequency, a second resonant network connected to the other of said output electrodes, and being tuned to a frequency lower than said carrier wave, a leak path connected to said control grid including a source of potential for biasing said grid positive to said cathode, and modulating means to vary the potential of said biasing source in accordance with the modulation of frequency required.

4. A generator of frequency modulated oscillations comprising a thermionic valve having two output electrodes, and having a control grid controlling the sum of the currents of said output electrodes, a feedback oscillator circuit connected between one of said output electrodes and said control grid, tuning means to vary the frequency of said oscillator circuit over a range of frequencies, a network comprising reactive impedance connected to the other of said output electrodes, said reactive impedance comprising resistance, inductance and capacity, all effectively in parallel and so selected or adjusted that said generator gives a substantially constant deviation sensitivity through its tuning range, and means to vary the control grid damping in accordance with the modulation of frequency required.

5. A generator of frequency modulated oscillations comprising a thermionic valve having two output electrodes and having a control grid controlling the sum of the currents of said output electrodes, a feedback oscillator circuit connected between one of said output electrodes and said control grid, tuning means to vary the frequency of said oscillator circuit over a range of frequencies, a network comprising reactive impedance connected to the other of said output electrodes, said reactive impedance being substantially solely capacitive so that deviation sensitivity is approximately proportional to carrier frequency, and means to vary the control grid damping in accordance with the modulation of frequency required.

6. A generator of frequency modulated oscillations comprising a thermionic valve having a cathode, two output electrodes, and a control grid controlling the sum of the currents of said output electrodes, a feedback oscillator circuit connected between one of said output electrodes and said control grid for generating carrier oscillations, tuning means for varying the frequency of said carrier oscillations over a range of frequencies, a circuit connecting the other of said output electrodes to said cathode and including an impedance having capacitive reactance over the tuning range of said oscillator circuit, and means to vary the control grid damping in accordance with the modulation of frequency required.

7. A generator of frequency modulated oscillations comprising a thermionic valve having a cathode, two output electrodes, and a control grid controlling the sum of the currents of said output electrodes, a feedback oscillator circuit connected between one of said output electrodes and said control grid for generating carrier oscillations, tuning means for varying the frequency of said carrier oscillations over a range of frequencies, a resonant network connected between the other of said output electrodes and said cathode and being tuned to a frequency lower than the tuning range of said oscillator circuit, and means to vary the control grid damping in accordance with the modulation of frequency required.

OWEN HOSMER DAVIE.

REFERENCES CITED

The following references are of record in the file of this patent:

UNITED STATES PATENTS

| Number | Name | Date |
| --- | --- | --- |
| 1,566,245 | Brackett | Dec. 15, 1925 |
| 2,321,354 | Bell et al. | June 8, 1943 |
| 2,361,731 | Bach | Oct. 31, 1944 |

FOREIGN PATENTS

| Number | Country | Date |
| --- | --- | --- |
| 246,892 | Great Britain | Feb. 3, 1926 |